US009015278B2

(12) United States Patent
Bansal et al.

(10) Patent No.: US 9,015,278 B2
(45) Date of Patent: Apr. 21, 2015

(54) TRANSACTION CORRELATION USING THREE WAY HANDSHAKE

(71) Applicant: AppDynamics, Inc., San Francisco, CA (US)

(72) Inventors: Jyoti Bansal, San Francisco, CA (US); Bhaskar Sunkara, San Francisco, CA (US)

(73) Assignee: AppDynamics, Inc., San Francisco, CA (US)

( * ) Notice: Subject to any disclaimer, the term of this patent is extended or adjusted under 35 U.S.C. 154(b) by 0 days.

(21) Appl. No.: 14/075,979

(22) Filed: Nov. 8, 2013

(65) Prior Publication Data
US 2014/0068003 A1 Mar. 6, 2014

Related U.S. Application Data

(63) Continuation of application No. 12/878,919, filed on Sep. 9, 2010.

(60) Provisional application No. 61/241,256, filed on Sep. 10, 2009.

(51) Int. Cl.
*G06F 15/16* (2006.01)
*H04L 29/08* (2006.01)
*H04L 12/26* (2006.01)
*G06Q 40/00* (2012.01)
*H04L 12/24* (2006.01)

(52) U.S. Cl.
CPC .............. *H04L 67/10* (2013.01); *H04L 43/50* (2013.01); *G06Q 40/00* (2013.01); *H04L 43/04* (2013.01); *H04L 41/5038* (2013.01); *H04L 41/5083* (2013.01)

(58) Field of Classification Search
CPC ......... H04L 12/26; H04L 43/04; H04L 43/50; G06Q 40/00
USPC ................... 709/200, 224; 717/127; 718/101; 719/317
See application file for complete search history.

(56) References Cited

U.S. PATENT DOCUMENTS

| 5,781,703 | A | * | 7/1998 | Desai et al. ....................... 706/50 |
| 6,002,872 | A | * | 12/1999 | Alexander et al. ............ 717/127 |
| 6,225,995 | B1 | * | 5/2001 | Jacobs et al. ................... 715/738 |
| 6,295,548 | B1 | | 9/2001 | Klein et al. |
| 6,324,492 | B1 | * | 11/2001 | Rowe .............................. 703/13 |

(Continued)

OTHER PUBLICATIONS

U.S. Appl. No. 12/878,919; Office Action mailed Jan. 29, 2014.
(Continued)

*Primary Examiner* — Anthony Mejia
(74) *Attorney, Agent, or Firm* — Lewis Roca Rothgerber LLP

(57) ABSTRACT

The present technology monitors a web application provided by one or more services. A service may be provided by applications. The monitoring system provides end-to-end business transaction visibility, identifies performance issues quickly and has dynamical scaling capability across monitored systems including cloud systems, virtual systems and physical infrastructures. A method for communicating data between servers may detect by a first computer a request to a second computer. The request and a first name may be sent to the second computer by the first computer. The first name and request information may be sent to a server by the first computer. The first name and a second computer identifier may be transmitted to the server by the second computer.

27 Claims, 11 Drawing Sheets

(56) References Cited

U.S. PATENT DOCUMENTS

| | | | |
|---|---|---|---|
| 6,324,683 B1* | 11/2001 | Fuh et al. | 717/124 |
| 6,378,070 B1* | 4/2002 | Chan et al. | 713/155 |
| 6,457,142 B1* | 9/2002 | Klemm et al. | 714/38.12 |
| 6,496,825 B1* | 12/2002 | Klein et al. | 1/1 |
| 6,529,932 B1* | 3/2003 | Dadiomov et al. | 718/101 |
| 6,546,548 B1 | 4/2003 | Berry et al. | |
| 6,553,564 B1 | 4/2003 | Alexander et al. | |
| 6,651,243 B1 | 11/2003 | Berry et al. | |
| 6,718,230 B2 | 4/2004 | Nishiyama | |
| 6,721,941 B1* | 4/2004 | Morshed et al. | 717/127 |
| 6,760,903 B1* | 7/2004 | Morshed et al. | 717/130 |
| 6,944,797 B1* | 9/2005 | Guthrie et al. | 714/45 |
| 6,978,401 B2* | 12/2005 | Avvari et al. | 714/38.13 |
| 6,985,912 B2* | 1/2006 | Mullins et al. | 1/1 |
| 7,124,354 B1 | 10/2006 | Ramani et al. | |
| 7,233,941 B2 | 6/2007 | Tanaka | |
| 7,328,213 B2* | 2/2008 | Suzuki et al. | 1/1 |
| 7,406,523 B1* | 7/2008 | Kruy et al. | 709/227 |
| 7,496,901 B2* | 2/2009 | Begg et al. | 717/128 |
| 7,499,951 B2 | 3/2009 | Mueller et al. | |
| 7,506,047 B2* | 3/2009 | Wiles, Jr. | 709/224 |
| 7,519,959 B1* | 4/2009 | Dmitriev | 717/128 |
| 7,523,067 B1* | 4/2009 | Nakajima | 705/39 |
| 7,577,105 B2* | 8/2009 | Takeyoshi et al. | 370/254 |
| 7,606,814 B2* | 10/2009 | Deily et al. | 1/1 |
| 7,689,688 B2* | 3/2010 | Iwamoto | 709/224 |
| 7,721,268 B2 | 5/2010 | Loh et al. | |
| 7,730,489 B1* | 6/2010 | Duvur et al. | 718/104 |
| 7,739,675 B2* | 6/2010 | Klein | 717/151 |
| 7,792,948 B2* | 9/2010 | Zhao et al. | 709/224 |
| 7,836,176 B2* | 11/2010 | Gore et al. | 709/224 |
| 7,844,033 B2* | 11/2010 | Drum et al. | 379/32.05 |
| 7,877,642 B2* | 1/2011 | Ding et al. | 717/133 |
| 7,886,297 B2* | 2/2011 | Nagano et al. | 718/101 |
| 7,908,346 B2 | 3/2011 | Boykin et al. | |
| 7,953,850 B2* | 5/2011 | Mani et al. | 709/224 |
| 7,953,895 B1* | 5/2011 | Narayanaswamy et al. | 709/250 |
| 7,966,172 B2* | 6/2011 | Ruiz et al. | 704/9 |
| 7,979,569 B2* | 7/2011 | Eisner et al. | 709/231 |
| 7,992,045 B2* | 8/2011 | Bansal et al. | 714/38.1 |
| 8,001,546 B2 | 8/2011 | Felt et al. | |
| 8,005,943 B2* | 8/2011 | Zuzga et al. | 709/224 |
| 8,069,140 B2* | 11/2011 | Enenkiel | 707/610 |
| 8,099,631 B2 | 1/2012 | Tsevtkov | |
| 8,132,170 B2* | 3/2012 | Kuiper et al. | 718/100 |
| 8,155,987 B2* | 4/2012 | Jaeck et al. | 705/7.11 |
| 8,205,035 B2* | 6/2012 | Reddy et al. | 711/103 |
| 8,286,139 B2* | 10/2012 | Jones et al. | 717/128 |
| 8,438,427 B2 | 5/2013 | Beck et al. | |
| 8,560,449 B1* | 10/2013 | Sears | 705/42 |
| 8,606,692 B2* | 12/2013 | Carleton et al. | 705/38 |
| 8,843,684 B2 | 9/2014 | Jones et al. | |
| 8,935,395 B2 | 1/2015 | Bansal et al. | |
| 2002/0016839 A1* | 2/2002 | Smith et al. | 709/224 |
| 2002/0021796 A1* | 2/2002 | Schessel | 379/207.02 |
| 2002/0052962 A1* | 5/2002 | Cherkasova et al. | 709/229 |
| 2003/0093433 A1 | 5/2003 | Seaman et al. | |
| 2003/0158944 A1* | 8/2003 | Branson et al. | 709/227 |
| 2003/0206192 A1* | 11/2003 | Chen et al. | 345/733 |
| 2004/0049574 A1* | 3/2004 | Watson et al. | 709/224 |
| 2004/0133882 A1* | 7/2004 | Angel et al. | 717/130 |
| 2004/0193552 A1* | 9/2004 | Ikenaga et al. | 705/75 |
| 2004/0199815 A1* | 10/2004 | Dinker et al. | 714/21 |
| 2004/0215768 A1* | 10/2004 | Oulu et al. | 709/224 |
| 2005/0004952 A1* | 1/2005 | Suzuki et al. | 707/200 |
| 2005/0021736 A1* | 1/2005 | Carusi et al. | 709/224 |
| 2005/0071447 A1* | 3/2005 | Masek et al. | 709/223 |
| 2005/0235054 A1* | 10/2005 | Kadashevich | 709/223 |
| 2006/0015512 A1 | 1/2006 | Alon et al. | |
| 2006/0136920 A1* | 6/2006 | Nagano et al. | 718/100 |
| 2006/0143188 A1* | 6/2006 | Bright et al. | 707/10 |
| 2006/0155753 A1* | 7/2006 | Asher et al. | 707/102 |
| 2006/0291388 A1* | 12/2006 | Amdahl et al. | 370/230 |
| 2007/0038896 A1* | 2/2007 | Champlin et al. | 714/38 |
| 2007/0074150 A1 | 3/2007 | Jolfaei et al. | |
| 2007/0124342 A1* | 5/2007 | Yamamoto et al. | 707/202 |
| 2007/0143290 A1* | 6/2007 | Fujimoto et al. | 707/9 |
| 2007/0250600 A1 | 10/2007 | Freese et al. | |
| 2007/0266148 A1 | 11/2007 | Ruiz et al. | |
| 2008/0034417 A1* | 2/2008 | He et al. | 726/15 |
| 2008/0066068 A1* | 3/2008 | Felt et al. | 718/101 |
| 2008/0109684 A1* | 5/2008 | Addleman et al. | 714/47 |
| 2008/0134209 A1* | 6/2008 | Bansal et al. | 719/317 |
| 2008/0148240 A1* | 6/2008 | Jones et al. | 717/130 |
| 2008/0163174 A1* | 7/2008 | Krauss | 717/127 |
| 2008/0243865 A1* | 10/2008 | Hu et al. | 707/10 |
| 2008/0307441 A1* | 12/2008 | Kuiper et al. | 719/321 |
| 2009/0006116 A1* | 1/2009 | Baker et al. | 705/1 |
| 2009/0007072 A1* | 1/2009 | Singhal et al. | 717/124 |
| 2009/0049429 A1 | 2/2009 | Greifeneder et al. | |
| 2009/0064148 A1 | 3/2009 | Jaeck et al. | |
| 2009/0106601 A1* | 4/2009 | Ngai et al. | 714/39 |
| 2009/0138881 A1* | 5/2009 | Anand et al. | 718/104 |
| 2009/0150908 A1 | 6/2009 | Shankaranarayanan et al. | |
| 2009/0193443 A1* | 7/2009 | Lakshmanan et al. | 719/330 |
| 2009/0210876 A1* | 8/2009 | Shen et al. | 718/100 |
| 2009/0216874 A1* | 8/2009 | Thain et al. | 709/224 |
| 2009/0241095 A1* | 9/2009 | Jones et al. | 717/128 |
| 2009/0287815 A1* | 11/2009 | Robbins et al. | 709/224 |
| 2009/0328180 A1* | 12/2009 | Coles et al. | 726/9 |
| 2010/0017583 A1* | 1/2010 | Kuiper et al. | 712/227 |
| 2010/0088404 A1* | 4/2010 | Mani et al. | 709/224 |
| 2010/0094992 A1* | 4/2010 | Cherkasova et al. | 709/224 |
| 2010/0100774 A1* | 4/2010 | Ding et al. | 714/45 |
| 2010/0131931 A1* | 5/2010 | Musuvathi et al. | 717/128 |
| 2010/0131956 A1* | 5/2010 | Drepper | 718/104 |
| 2010/0138703 A1* | 6/2010 | Bansal et al. | 714/57 |
| 2010/0183007 A1* | 7/2010 | Zhao et al. | 370/389 |
| 2010/0257510 A1* | 10/2010 | Horley et al. | 717/128 |
| 2010/0262703 A1* | 10/2010 | Faynberg et al. | 709/229 |
| 2010/0268797 A1* | 10/2010 | Pyrik et al. | 709/220 |
| 2010/0312888 A1 | 12/2010 | Alon et al. | |
| 2010/0318648 A1* | 12/2010 | Agrawal et al. | 709/224 |
| 2011/0016328 A1* | 1/2011 | Qu et al. | 713/189 |
| 2011/0087722 A1* | 4/2011 | Clementi et al. | 709/202 |
| 2011/0088045 A1* | 4/2011 | Clementi et al. | 719/317 |
| 2011/0264790 A1* | 10/2011 | Haeuptle et al. | 709/224 |
| 2012/0117544 A1* | 5/2012 | Kakulamarri et al. | 717/126 |
| 2012/0191893 A1* | 7/2012 | Kuiper et al. | 710/269 |
| 2012/0291113 A1* | 11/2012 | Zapata et al. | 726/7 |
| 2012/0297371 A1* | 11/2012 | Greifeneder et al. | 717/128 |
| 2014/0052624 A1 | 2/2014 | Bansal et al. | |
| 2014/0052856 A1 | 2/2014 | Bansal et al. | |
| 2014/0052857 A1 | 2/2014 | Bansal et al. | |

OTHER PUBLICATIONS

U.S. Appl. No. 12/878,919; Final Office Action mailed Dec. 18, 2012.
U.S. Appl. No. 12/878,919; Office Action mailed May 25, 2012.
U.S. Appl. No. 14/069,355; Office Action mailed Jan. 15, 2014.
U.S. Appl. No. 14/069,356; Office Action mailed Jan. 30, 2014.
U.S. Appl. No. 14/069,357; Office Action mailed Dec. 9, 2013.
U.S. Appl. No. 14/069,355; Final Office Action mailed Aug. 4, 2014.
U.S. Appl. No. 14/069,356; Office Action mailed Aug. 14, 2014.
U.S. Appl. No. 14/069,357; Final Office Action mailed Jul. 7, 2014.
U.S. Appl. No. 12/878,919; Office Action mailed Sep. 29, 2014.

* cited by examiner

TRANSACTION CORRELATION USING THREE WAY HANDSHAKE

CROSS-REFERENCE TO RELATED APPLICATIONS

This application is a continuation of U.S. patent application Ser. No. 12/878,919, titled "Monitoring Distributed Web Application Transactions," filed, Sep. 9, 2010, which claims the priority benefit of U.S. Provisional Application Ser. No. 61/241,256, titled "Automated Monitoring of Business Transactions," filed Sep. 10, 2009, the disclosures of which are incorporated herein by reference.

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

Monitoring a web application helps to provide insight regarding bottle necks in communication, communication failures and other information regarding performance of the services the provide the web application. When a web application is distributed over several machines, tracking the performance of the web service can become impractical with large amounts of data collected from each machine.

There is a need in the art for web service monitoring which may accurately and efficiently monitor the performance of distributed applications which provide a web service.

SUMMARY OF THE CLAIMED INVENTION

The present technology monitors a network or web application provided by one or more distributed network services. The monitoring system may monitor distributed web applications across a variety of infrastructures. The system is easy to deploy and provides end-to-end business transaction visibility. The monitoring system may identify performance issues quickly and has a dynamical scaling capability across a monitored system. The present monitoring technology has a low footprint and may be used with cloud systems, virtual systems and physical infrastructures.

Agents may be installed on one or more servers at an application level, virtual machine level, or other level. An agent may monitor a corresponding application and application communications. The web application may consist of one or more services implemented by a virtual machine, or an application within a virtual machine, on an application server. Each agent may communicate with a controller and provide monitoring data to the controller. The controller may process the data to evaluate the performance of the application, model the flow of the web application, and determine information regarding distributed web application performance. The monitoring technology determines how each distributed application portion is operating, establishes a baseband for operation, and determines the architecture of the distributed system.

The present technology may monitor a distributed application that performs one or more business transactions. Agents may communicate with code within an application that monitors calls and requests received and sent by an application. By monitoring incoming and outgoing calls and requests, and by monitoring the performance of services (virtual machine) that process the incoming and outgoing request, the present technology may determine the performance and structure of complicated and distributed business transactions.

Monitoring a business transaction may include associating a request received by an application with a thread of an application. A call may be modified with monitoring parameters by the application, wherein the call may be determined to be associated with the thread. Runtime data that includes the monitoring parameters may and is associated with the call may be reported to a controller.

A controller may receive runtime data from a plurality of servers. A mapping of the plurality of servers may be constructed based on the runtime data. Performance data may be determined for each of the plurality of servers based on the runtime data.

A method for communicating data between servers may detect by a first computer a request to a second computer. The request and a first name may be sent to the second computer by the first computer. The first name and request information may be sent to a server by the first computer. The first name and a second computer identifier may be transmitted to the server by the second computer.

DETAILED DESCRIPTION

The present technology monitors a network or web application provided by one or more distributed applications. The web application may be provided by one or more web services each implemented as a virtual machine or one or more applications implemented on a virtual machine. Agents may be installed on one or more servers at an application level, virtual machine level, or other level. An agent may monitor a corresponding application (or virtual machine) and application communications. Each agent may communicate with a controller and provide monitoring data to the controller. The controller may process the data to evaluate the performance of the application or virtual machine, model the flow of the application, and determine information regarding the distributed web application performance. The monitoring technology determines how each distributed web application portion is operating, establishes a baseband for operation, and determines the architecture of the distributed system.

The monitoring system may monitor distributed web applications across a variety of infrastructures. The system is easy to deploy and provides end-to-end business transaction visibility. The monitoring system may identify performance issues quickly and has a dynamical scaling capability across a monitored system. The present monitoring technology has a low footprint and may be used with cloud systems, virtual systems and physical infrastructures.

The present technology may monitor a distributed web application that performs one or more business transactions. A business transaction may be a set of tasks performed by one or more distributed web applications in the course of a service provide over a network. In an e-commerce service, a business transaction may be "add to cart" or "check-out" transactions performed by the distributed application.

Agents may communicate with code within virtual machine or an application. The code may detect when an application entry point is called and when an application exit point is called. An application entry point may include a call received by the application. An application exit point may include a call made by the application to another application, virtual machine, server, or some other entity. The code within the application may insert information into an outgoing call or request (exit point) and detect information contained in a received call or request (entry point). By monitoring incoming and outgoing calls and requests, and by monitoring the performance of a local application that processes the incoming and outgoing request, the present technology may determine the performance and structure of complicated and distributed business transactions.

Figure 1:
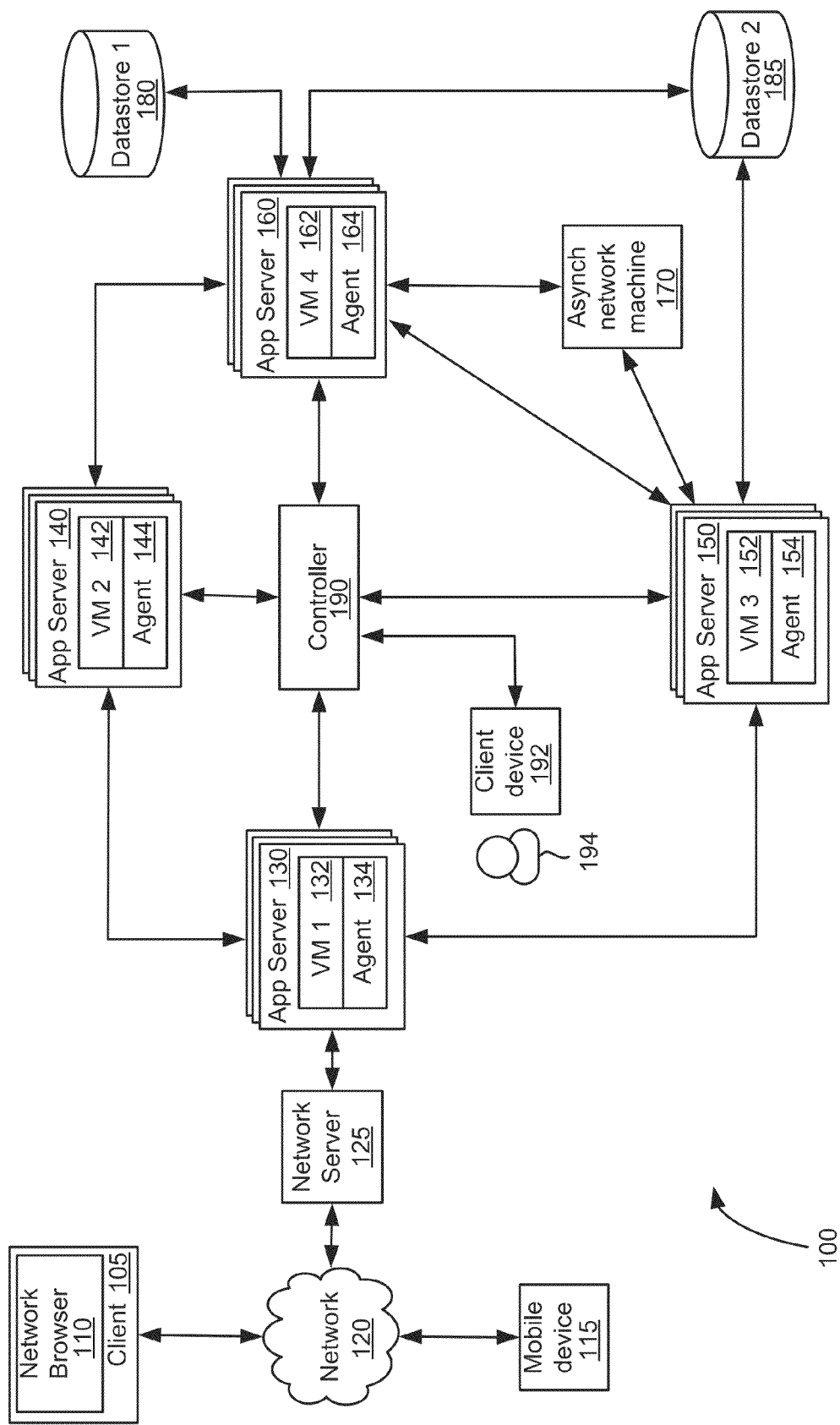
FIG. 1 is a block diagram of an exemplary system for monitoring business transactions.

FIG. 1 is a block diagram of an exemplary system 100 for monitoring business transactions. System 100 of FIG. 1 includes client device 105, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, or a combination of these networks.

Network server 125 is connected to network 120 and may receive and process requests received over network 120. Network server 125 may be implemented as one or more servers implementing a network service. When network 120 is the Internet, network server 125 maybe implemented as a web server.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1.

Virtual machine 132 may be implemented by code running on one or more application servers. The code may implement computer programs, modules and data structures to implement a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at lease a portion of a distributed business transaction. Agents 144, 154 and 164 may monitor the virtual machines 142-162, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Figure 2:
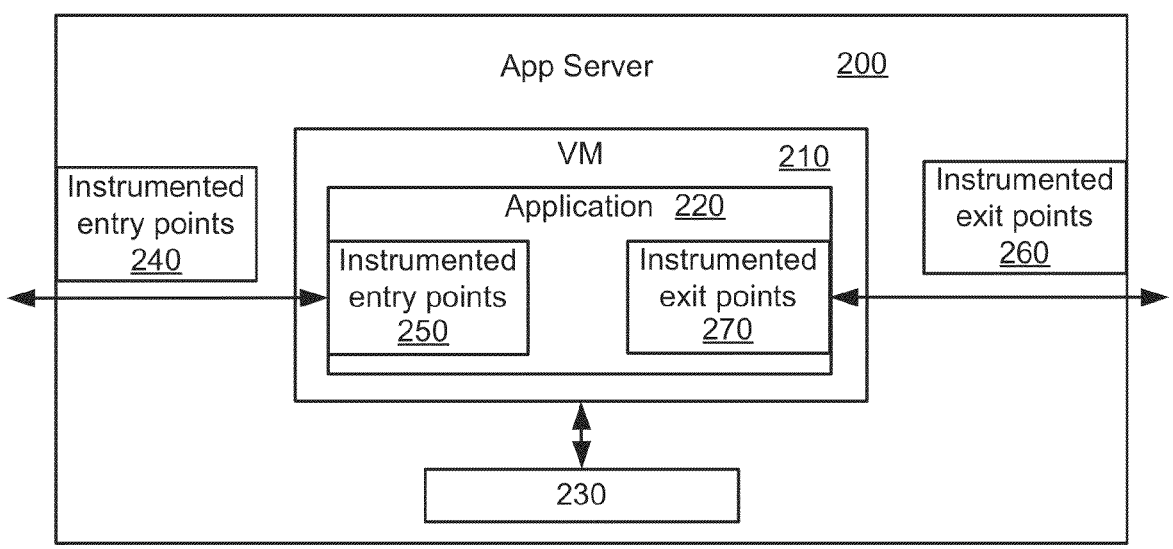
FIG. 2 is a block diagram of an exemplary application server.

FIG. 2 is a block diagram of an exemplary application server 200. The application server in FIG. 2 provides more information for each application server of system 100 in FIG. 1. Application server 200 of FIG. 2 includes a virtual machine 210, application 220 executing on the virtual machine, and agent 230. Virtual machine 210 may be implemented by programs and/or hardware. For example, virtual machine 134 may be implemented as a JAVA virtual machine. Application 220 may execute on virtual machine 210 and may implement at least a portion of a distributed application performed by application servers 130-160. Application server 200, virtual machine 210 and agent 230 may be used to implement any application server, virtual machine and agent of a system such as that illustrated in FIG. 1.

Application server 200 and application 220 can be instrumented via byte code instrumentation at exit and entry points. An entry point may be a method or module that accepts a call to application 220, virtual machine 210, or application server 200. An exit point is a module or program that makes a call to another application or application server. As illustrated in FIG. 2, an application server 200 can have byte code instrumented entry points 240 and byte code instrumented exit points 260. Similarly, an application 220 can have byte code instrumentation entry points 250 and byte code instrumentation exit points 270. For example, the exit points may include calls to JDBC, JMS, HTTP, SOAP, and RMI. Instrumented entry points may receive calls associated with these protocols as well.

Agent 230 may be one or more programs that receive information from an entry point or exit point. Agent 230 may process the received information, may retrieve, modify and remove information associated with a thread, may access, retrieve and modify information for a sent or received call, and may communicate with a controller 190. Agent 230 may be implemented outside virtual machine 210, within virtual machine 210, and within application 220, or a combination of these.

Figure 3:
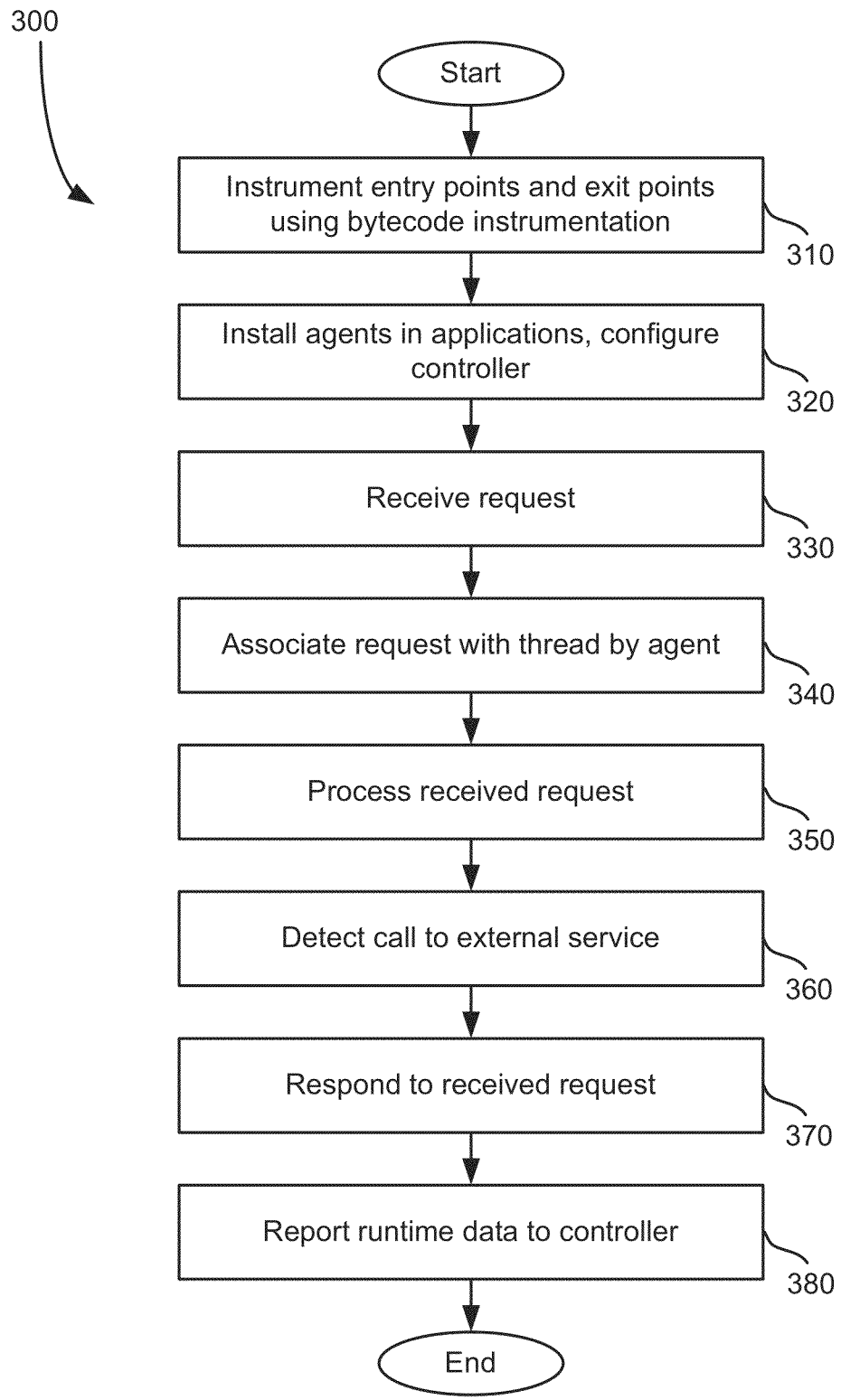
FIG. 3 is a flowchart of an exemplary method for monitoring business transactions.

FIG. 3 is a flowchart of an exemplary method for monitoring business transactions. In some embodiments, the method of FIG. 3 can be performed at any of application servers 130, 140, 150 and 160. Operation of controller 190 is discussed in more detail with respect to FIG. 8.

Entry points and exit points are instrumented using byte code instrumentation at step 310. The entry and exit points may be instrumented in an application residing on an application sever. The entry and exit points may also be instrumented in a virtual machine residing on an application sever. Instrumented exit points may include code that implements a call or request by an application or application server, such as to JDBC, JMS, HTTP, SOAP, and RMI calls. The instrumented entry points may include code that implements the processing of a received call or request, such as routines and methods that handle calls received by a virtual machine or application residing on an application server.

An application's object code, or bytecode, may be instrumented to insert "hooks"—portions of code that may retrieve information from an application, virtual machine, or other code. For example, application object code or source code may also be modified or instrumented. The hooks may be added via instrumentation to detect activity initiated by one or more threads used by an application or virtual machine. The hooks may retrieve information and send information without modifying the logic of an application.

In some embodiments, byte instrumented code may detect a received request or call and identify the thread which is automatically associated with the call. The thread identification is then provided to an agent, which may record the time of the received request. The agent may also modify information associated with the thread as discussed in more detail below. Instrumented byte code may also detect a call made by an application or virtual machine. When an outgoing call is received, the agent may record the time of the outgoing call as well as the thread that initiated the call.

Agents may be installed on an application server at step 320. The agents may be installed on an application server and within a virtual machine, within an application, or outside a virtual machine. The agent may be added by byte code instrumentation, by downloading code to be installed on to the application server, or by some other method. At some point, controller 190 may also be configured. Configuring controller 190 may include loading software onto controller 190 for communicating with one or more agents, processing runtime data, reporting performance information, and performing other operations. Operation of controller 190 is discussed in more detail with respect to FIG. 8.

The present technology may map and monitor a business transaction by collecting data associated with calls received by and sent by an application or virtual machine. When a call is sent from one application to another, the present technology may modify the header of the call with monitoring parameters, including an identifier of the source of the call and the recipient of the call. Though calls may be received and sent in any order, steps 330-350 relate to processing a call received by an application and step 360 relates to processing a call sent by an application.

A request is received by an application server at step 330. The request may be received, such as for example, by application server 130 via network server 125. The request may be received from an external service, such as from VM2 on application server 140. A request may also be received by any of application servers 140-160 from another application server as part of a distributed business transaction. Next, the received request is associated with a thread by an agent at step 340. The agent located on the application server which received the request associates the request with a thread. Associating the request with a thread may include detecting the request at an instrumented entry point and identifying what business transaction is associated with the request. Once the business transaction is identified, the business transaction is associated with the thread handling the request. Associating a request with a thread is discussed in more detail below with respect to the method of FIG. 4.

The received request may be processed at step 350. Processing the request may include performing one or more operations or transactions by an application residing on the application server which received the request.

When a request or call is received by an application or virtual machine, the present technology may insert an identifier for the recipient of the call in the request, for example in the header of the received request. When receiving a request, monitoring parameters within the request may indicate whether the call recipient was recognized by the calling entity. An agent in the recipient application server may determine the status of the recipient of the request (for example, whether the application receiving the call was known or unknown to the calling application) and proceed accordingly. For example, the agent on the receiving application server may append or modify a portion of monitoring parameter, such as for example a call chain, and store the parameters locally. The agent may also verify its identity to the controller through one or more communications with controller 190. Processing a received request (or call) is discussed in more detail below with respect to FIG. 5.

A call to an external service may be detected at step 360. The call may be required to complete processing of the request received at step 330. The call itself may be detected by instrumented exit points 260 or 270 and may be made to an external service such as that provided by a virtual machine on an external application server.

When detected, the call may be modified with monitoring parameters. An agent on the application server making the call may modify the call as part of a business transaction. The agent may modify the call with monitoring parameters, such as for example an application identifier, transaction identifier, request identifier, caller chain information, and diagnostic status. In some embodiments, the call is modified by adding thread information such as monitoring parameters from a "thread local" file to the outgoing thread. The monitoring parameter data may be added to the "thread local" file by an agent. Generating a call in response to a received request is discussed in more detail below with respect to FIG. 6.

An application server may respond to a received request at step 370. If a call is made by the application server while processing the request, the response to the call may be received and processed as part of generating a response to the received request. Responding to a request is discussed in more detail with respect to the method of FIG. 7A.

Runtime data may be reported to a controller at step 380. Each agent may collect runtime data from instrumented entry points and exit points during execution of applications within the virtual machine. As the agent receives the runtime data, the data may be aggregated and reported to controller 190. Data, such as for example detailed data regarding a particular request, may also be reported to controller 190 without aggregating the data. Reporting runtime data to a controller is discussed in more detail below with respect to FIG. 7B.

Figure 4:
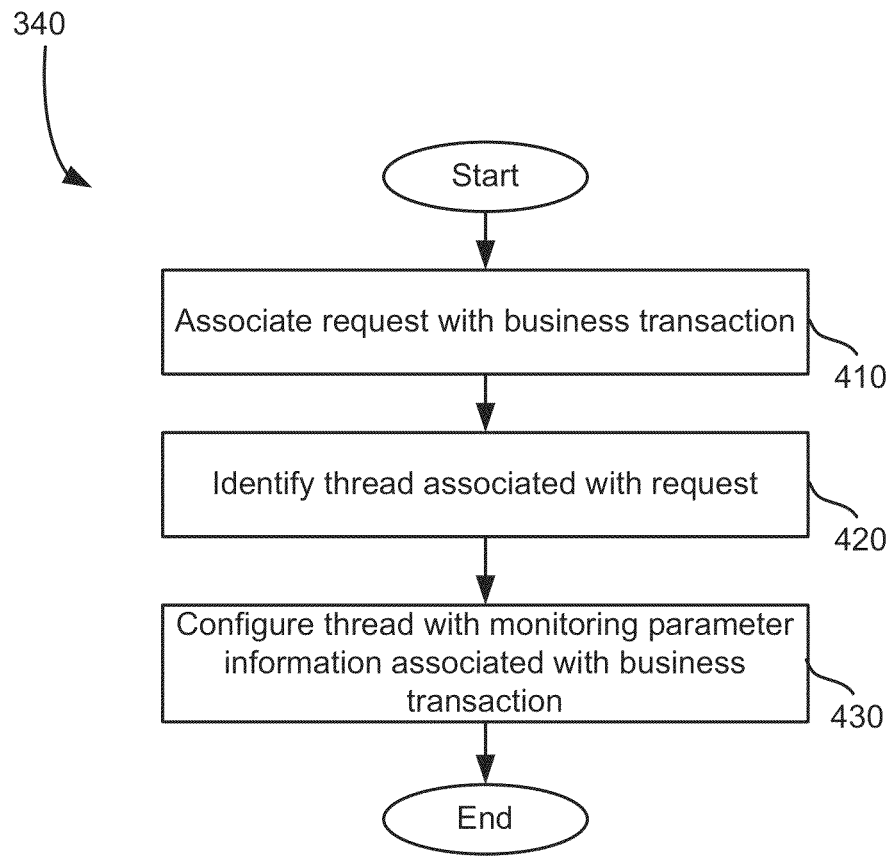
FIG. 4 is a flowchart of an exemplary method for associating a request with a thread.

FIG. 4 is a flowchart of an exemplary method for associating a request with a thread. The method of FIG. 4 may provide more detail for step 340 in the method of FIG. 3. A request may be associated with a business transaction at step 410. When a request is received by a virtual machine, the instrumented entry point may detect the received call and report the name of the call to an agent. The agent may determine what business transaction, if any, is associated with the received request. For example, the agent may compare the call name to a table of call names and associated business transactions. The thread associated with the request is identified at step 420. When a request is received, the request is assigned to a thread. The identified thread will handle the request until the request is completed.

The identified thread is then configured with monitoring parameter information at step 430. After determining that the request is associated with a business transaction, and then identifying which thread is associated with the request, the agent may configure the thread with monitor parameter information for the business transaction. The monitor parameter information may be added to a "thread local" memory for the thread handling the request. The monitoring parameters may include an application identifier, transaction identifier, request identifier, call chain data, and diagnostics status.

The application identifier may be a global unique identifier (GUID) that uniquely identifies the application handling the thread. The transaction identifier may identify the business transaction associated with the request. The business transaction may be identified at step 410. A request identifier may identifier the particular request received by the application or virtual machine. The call chain data may identify the chain of applications or virtual machines that have processed the current business transaction thus far. For example, call chain data for a request received by VM4 from VM3 in the system of FIG. 1 may be "VM1-VM3-VM4." The diagnostic status may indicate the level the current business transaction data should be collected and reported.

Figure 5:
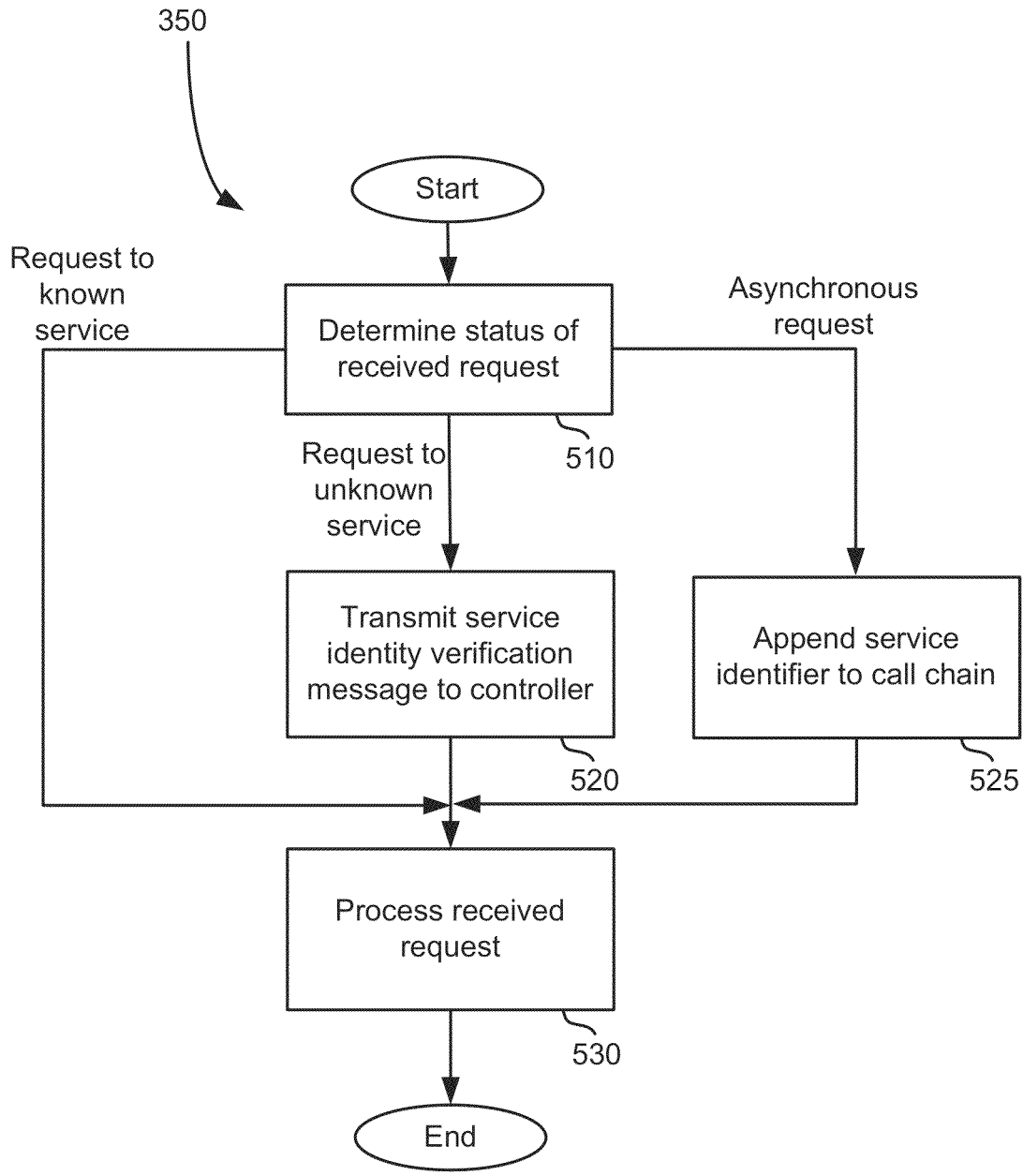
FIG. 5 is a flowchart of an exemplary method for processing a received request.

FIG. 5 is a flowchart of an exemplary method for processing a received request. The method of FIG. 5 may provide more detail for step 350 in the method of FIG. 3. A determination is made as to the status of a received at step 510. A request status may indicate the request is asynchronous, that the request is sent to a known external service, or that the request is sent to an unknown external service.

The request may be asynchronous if a response is not expected by the device which made the call. For example, in system 100 of FIG. 1, application server 150 may send an asynchronous request to asynchronous network machine 170. Rather than responding to application server 150, asynchronous network machine 170 may send a message to application server 160.

If the received request is asynchronous at step 510, method of FIG. 5 continues to step 525 where a service identifier is appended to the call chain. The service identifier may be added to the call chain by the agent associated with the virtual machine (or application) at the application server which receives the asynchronous message from asynchronous network machine 170. The service identifier may be added after the previous device identifier in the call chain. Hence, a service identifier for virtual machine 162 may be added after that for asynchronous network machine 170. Hence, if the call chain in system 100 of FIG. 1 reads as "VM1-VM2", the call chain may be appended with an service identifier for a asynchronous network machine 170 such that the call chain would read VM1-VM2-MQ when the message is received by a asynchronous network machine 170. This call chain would then be appended to include VM4 when application server 160 received the asynchronous communication from asynchronous network machine 170. After appending the service identifier to the previous device identifier in the call chain, the method of FIG. 5 continues to step 530.

If the request is made to a known service, the method continues to step 530.

If the calling application or virtual machine did not recognize the external service to receive a request or call, the calling application may place an unknown identifier at the end of the call chain in the header of the request. Upon receiving the request and detecting the unknown service identifier in the call chain, the unknown recipient may transmit a service identity verification message to controller 190. The identity verification message indicates to the controller that the service received a request with a particular unknown service identifier. The controller may process the identity verification message as discussed in more detail with respect to the method of FIG. 8. The recipient application may leave the unknown service identifier in the call chain, and add to the call chain appropriately when a call is detected that is related to the call chain (for example, by the same thread handling the received request). After transmitting the service identity verification message to controller 190, the method of claim 5 continues to step 530.

For example, virtual machine 132 may send a request to virtual machine 152, but agent 134 executing in virtual machine 132 may not recognize virtual machine 152. Agent 134 may place an "unknown" recipient identifier in the call chain of the request to virtual machine 152, as well as locally within the thread handling the call to virtual machine 152, to indicate the call recipient is not known. When the call is received by the recipient application server, the agent on the recipient application server may send an identity verification message to controller 190 at step 550. The identity verification message informs the controller of the actual identify for the "unknown" identifier, for example that unknown identifier "U45" is associated with virtual machine 152. The controller 190 may receive the request, store an indication that "U45" is associated with "VM4", and transmit an update to the agents in the system of FIG. 1 that virtual machine 152 is associated with a particular identifier (for example "VM4").

Returning to method 350, the received request is processed at step 530. Processing the request may include performing operations or executing methods as called in the received request, as well as placing calls to other external services. When the request has completed, a response is generated and transmitted to the calling service. Responding to a received request is discussed with respect to FIG. 3.

Figure 6:
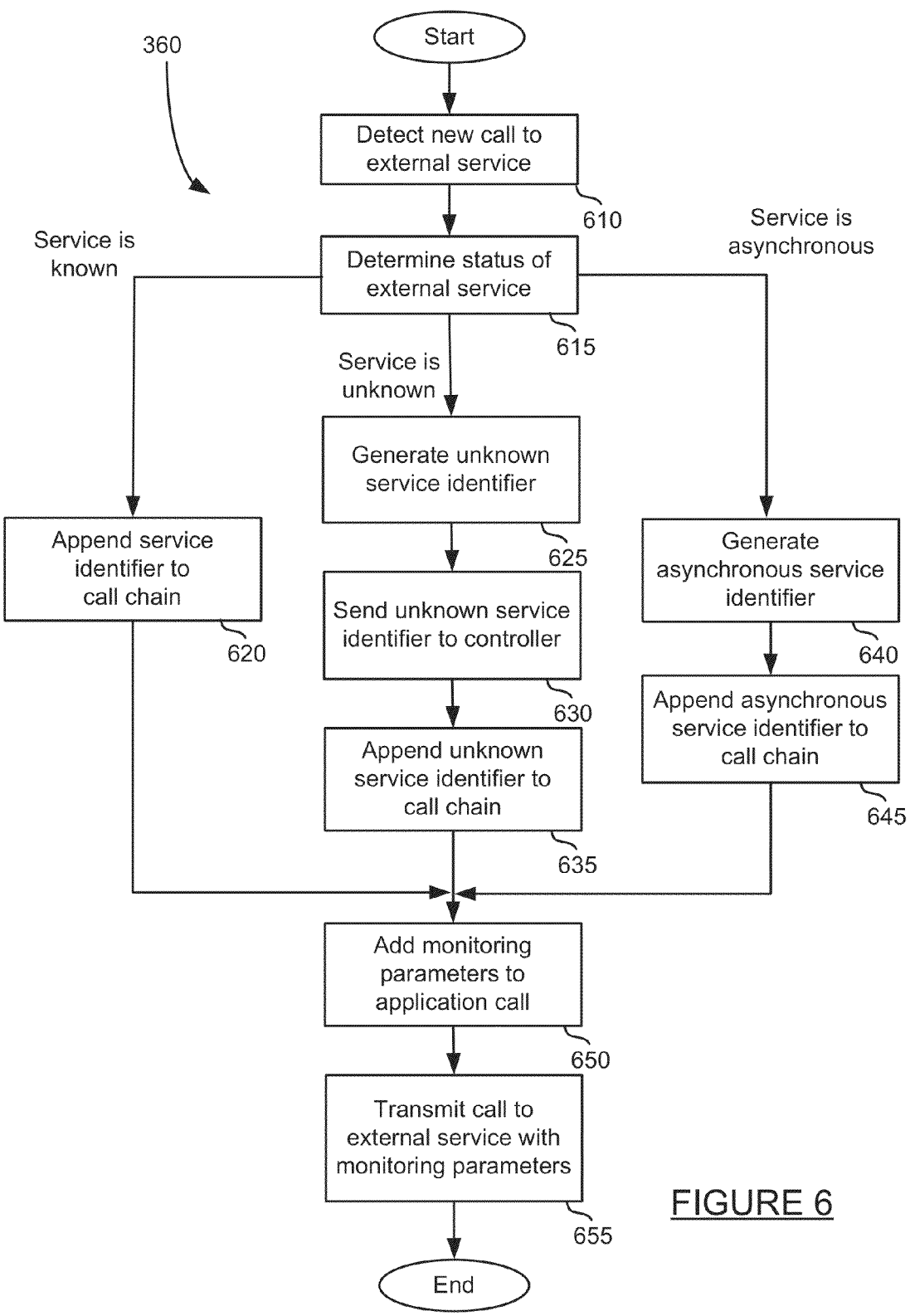
FIG. 6 is a flowchart of an exemplary method for generating a call.

FIG. 6 is a flowchart of an exemplary method for generating a call. The method of FIG. 6 may provide more detail for step 360 in the method of FIG. 3 and may be performed by an agent, such as agent 134 (though any agent on an application or virtual machine may implement the method of FIG. 6).

An outgoing call to an external service may be detected by an instrumented exit point at step 610. The instrumented exit point code may inform the agent of the type of call being made, such as for example the call protocol, by what application the call is being made, the recipient service of the call, and a time stamp associated with the call.

Next, a determination is made as to the status of the called external service (i.e., virtual machine or application executing on a virtual machine) at step 615. The external service status may be that the external service is known, the external service is unknown, or that the external service is called as part of an asynchronous transaction. The agent may have access to a list of recognized external services, (virtual machines, applications) and may compare the intended external service with known external service identifiers. If the external service is not recognized by the agent, the agent may create an unknown service identifier at step 625. The unknown service identifier may be sent to controller 190 at step 625. Identification information may also be sent to controller 190, such as an identification of the external service, the application server, a virtual machine, and other identification information.

The unknown service identifier may be inserted at the end of a call chain to be included within the call being made at step 635. For example, the unknown service identifier may be inserted into a call chain within the thread handling the call, and the call chain within the thread may be placed in the header of the call. The method of FIG. 6 then continues to step 650.

Returning to step 615, if the external service to receive the call is known, the service identifier which will receive the application call is appended to the call chain at step 520. The service identifier may be inserted into a call chain within the thread handling the call, and the call chain within the thread may eventually be placed in the header of the call. The method of FIG. 6 then continues to step 650.

If the call to the external service is part of an asynchronous application at step 615, an asynchronous service identifier is generated at step 645. The asynchronous service identifier is appended to the call chain, similarly to a service identifier, at step 645. The identifier may indicate that the portion of the transaction between the application making the application call and the recipient external service is asynchronous. After appending the asynchronous service identifier to the call chain, the method of FIG. 6 then continues to step 650.

The agent may add monitoring parameters to the outgoing external service call to the recipient application at step 650. The monitoring parameters may include an application identifier, a business transaction identifier, a request identifier, and a call chain. The identifiers may each be implemented as a globally unique identifier (GUID). The call chain indicates the portion of a business transaction chain handled locally by an application server. The call chain may identify nodes which receive and/or send calls or requests. For example, in the system of FIG. 1, a call chain for a request received by application 130 will list a node associated with the servers which implement application server 130 or virtual machine 132, e.g. VM1. If virtual machine 132 sends a request to virtual machine 142 on application server 140 as part of the business transaction, the call chain will comprise VM1-VM2. If VM2 then calls VM4 on application server 160, which in turn calls data store 180, the call chain may be extended to VM1-VM2-VM4 once virtual machine 162 receives the call from virtual machine 142. The call chain may be extended to VM1-VM2-VM4-DB1 when virtual machine 162 calls data store 180.

The monitoring parameters may also indicate a diagnostics status. The diagnostics status may be expressed as a boolean variable and indicate that more detail of monitoring information should be collected for a particular request. In some embodiments, if a particular business transaction, either in part or entirely, is determined to be operating less than optimally or not as expected, controller 190 may automatically configure agents involved in monitoring that business transaction to collect more detailed data associated a request associated with that business transaction. In collecting more detailed data, the diagnostics status boolean valve may be set to collect more data. When the diagnostics status boolean is set to "on", each agent involved in monitoring the particular business transaction may collect information associated with the business transaction request, including each method called as part of the business transaction, and not aggregate the data associated with the business transaction request. Rather, the runtime data monitored for the business transaction request is returned to controller 190; the runtime data associated with a business transaction being monitored in a diagnostics status "on" may not be aggregated.

A call with monitoring parameters is made to an external service (virtual machine or application executing on a virtual machine) at step 660. The call may be sent with the monitoring parameters included in the call, for example in the call header or some other portion of the call.

Figure 7A:
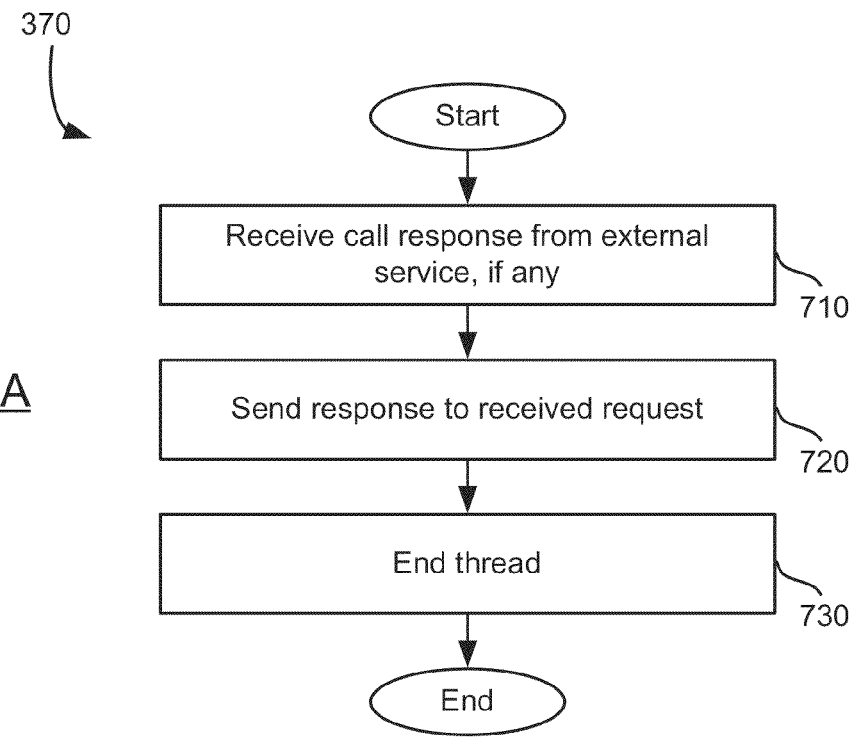
FIG. 7A is a flowchart of an exemplary method for responding to a received request.

FIG. 7A is a flowchart of an exemplary method for responding to a received request. The method of FIG. 7A may provide more information for step 370 in the method of FIG. 3. A response may be received from an external service at step 710 for a call made to the external service. The response may not be received for the call if the call is stalled. In this case, the agent at the current virtual machine or application which sent the call may determine, such as for example after a specific period of time, that the business transaction has stalled and indicate this in the runtime data appropriately.

A response is generated and sent for a received request at step 720. If a call is made by a virtual machine while processing the request, the response to the call may be received and processed as part of generating a response to the received request. After sending the response, the thread handling the call is closed at step 730.

Figure 7B:
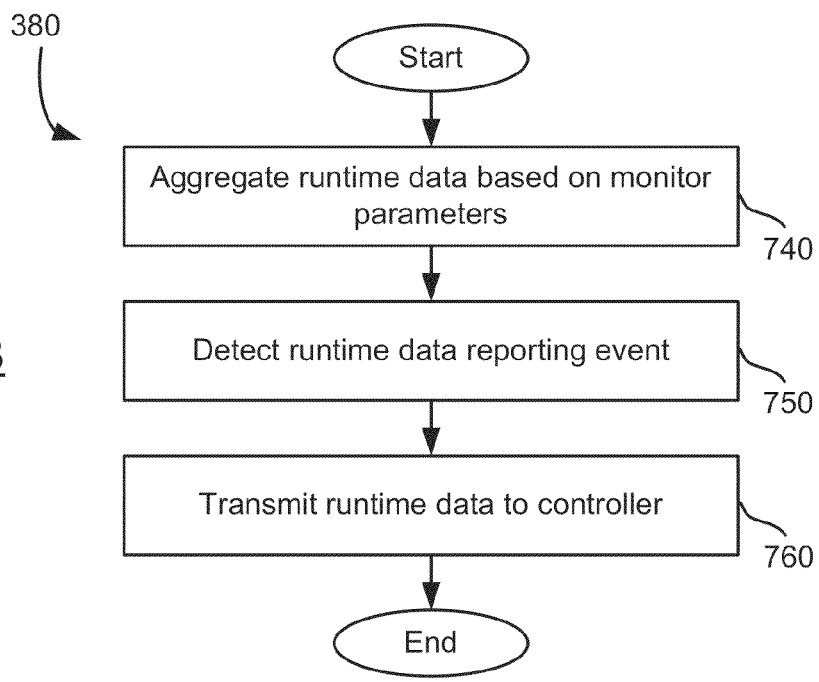
FIG. 7B is a flowchart of an exemplary method for reporting runtime data to a controller.

FIG. 7B is a flowchart of an exemplary method for reporting runtime data to a controller. Runtime data may be aggregated at step 740. The runtime data collected by an agent may be aggregated based on monitoring parameters and averaged over a period of time, for example one minute.

Runtime data associated with the call may be stored as it is received. In some embodiments, the runtime data may indicate the response time for the call to complete. The runtime data may include timing information associated with a business transaction, call chain and other parameter information, and other data. An agent may receive or retrieve a timestamp corresponding to the beginning and the end of an application call, method call, and other operations. The time stamps may be stored with a business transaction identifier, application identifier, calling chain, and optionally other data for the request within a thread handling the call. Information may be cleared from the thread handling the call once the application server has completed processing of a request. Once the call is completed, a response time may be generated for the overall call as well as intervening calls to other applications.

A runtime data reporting event may be detected at step 750. The runtime reporting event may be any of several events, for example the expiration of a timer, a state of one or more resources of the application server reporting the runtime data, or another event. For example, an agent may be configured to report data periodically every minute, or some other time period. The agent may also adjust the reporting based on the load on the application server on which it resides, for example by waiting to report runtime data if not many processor cycles are available or reporting the runtime data more often is a large number of processing cycles are available.

Runtime data may then be transmitted to a controller 190 by an agent at step 760. The transmitted runtime data may include the aggregated runtime data determined at step 750. Runtime data may also include non-aggregated data, such as for example detailed request data collected during a diagnostics status "on" mode. Runtime data may be transmitted to a controller 190 periodically, for example every minute, based on an event such as a request from controller 190 or the end of a business transaction being monitored in detail, or some other event.

Figure 8:
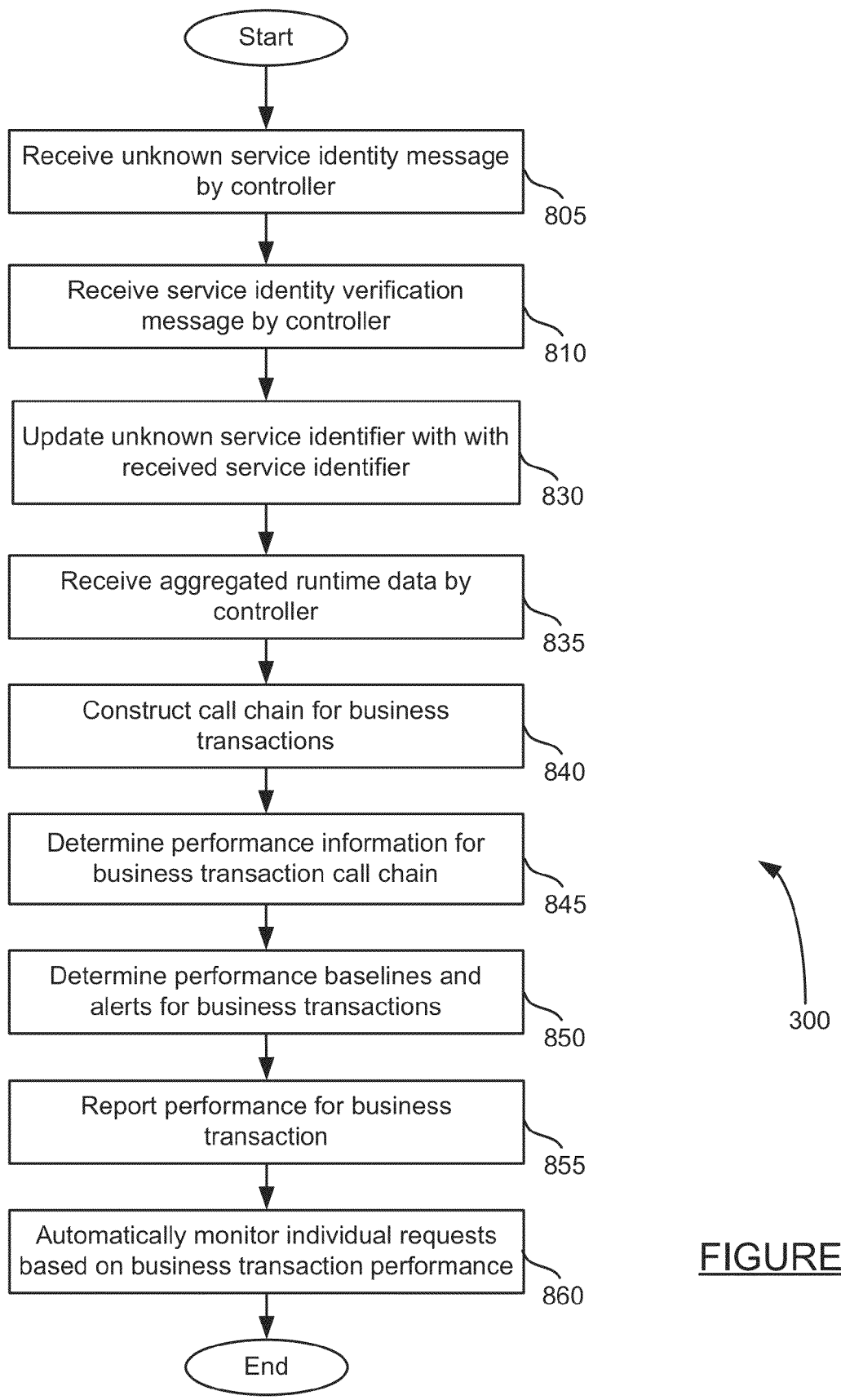
FIG. 8 is a flowchart of an exemplary method for controlling business transaction monitoring.

Controller 190 may receive data from one or more agents, process the data, and provide monitoring information regarding the system being monitored. When installed onto an application server, controller 190 may be initialized. Controller initialization may include loading information for application servers, such as identification information, loading transaction data, and other information. FIG. 8 is a flowchart of an exemplary method for controlling business transaction monitoring. The method of FIG. 8 may be performed by controller 190 in the system of FIG. 1.

Controller 190 may receive an unknown service identifier message from an agent at step 805. For example, if virtual machine 152 is to make a call to virtual machine 162 (or application) and agent 154 on virtual machine 152 does not recognize the recipient virtual machine (or application), agent 154 may generate an unknown service identifier and send the identifier to controller 190. The controller 190 may store machine identifiers, both known and unknown, and associated call names used by application methods.

A service identity verification message may be received by a controller from an agent at step 810. The service identity verification message may be generated by an agent and sent at step 520 in the method of FIG. 5. Upon receiving the service identity verification message, controller 190 may update the unknown service identifier with the received service identifier at step 830. Updating the unknown service identifier may include associating the unknown service identifier with the application server from which the application identity verification message was received, and sending a message with a service identifier to use for the application server to each agent.

Aggregated runtime data may be received from one or more agents at step 835. The aggregated runtime data may be received periodically, based upon an event, based upon load size of the data, or based on some other criteria. The aggregated runtime data may indicate a business transaction, call chain data, time stamp data, and other data. The business transaction may be associated with the request received at step 330. The call chain data of the aggregated data may include the call chain data received in the header of a request, if any, along with an identifier of the application or virtual machine processing the request. Aggregated data may be sent for each call chain combination. For example, for VM3 of FIG. 1, data may be aggregated for business transaction portions associated with call chain of VM1-VM3, VM1-VM3-VM4, VM3-VM4, or some other call chain portion.

Figure 9:
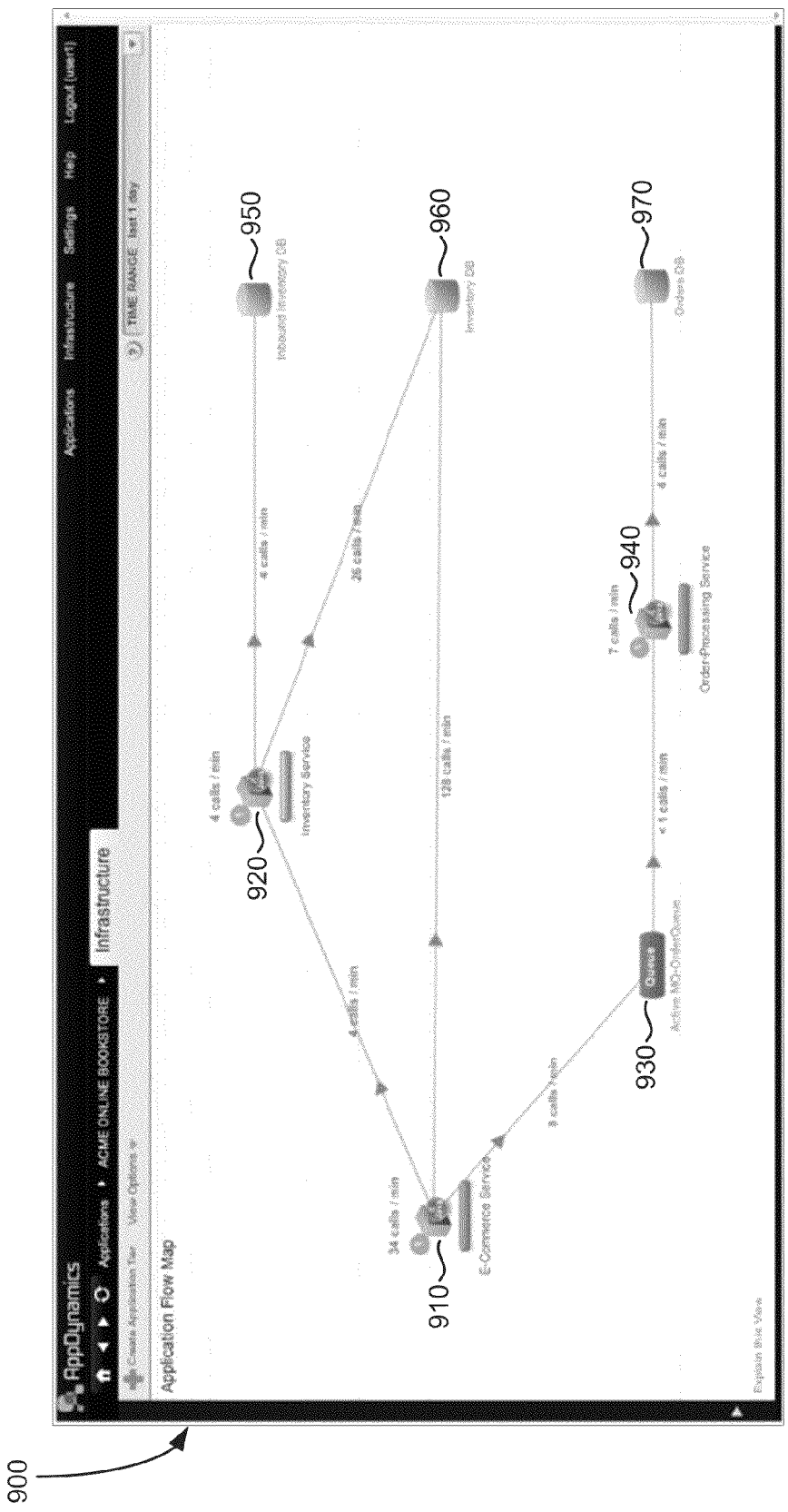
FIG. 9 is an exemplary interface for reporting monitoring data for business transactions.
Figure 10:
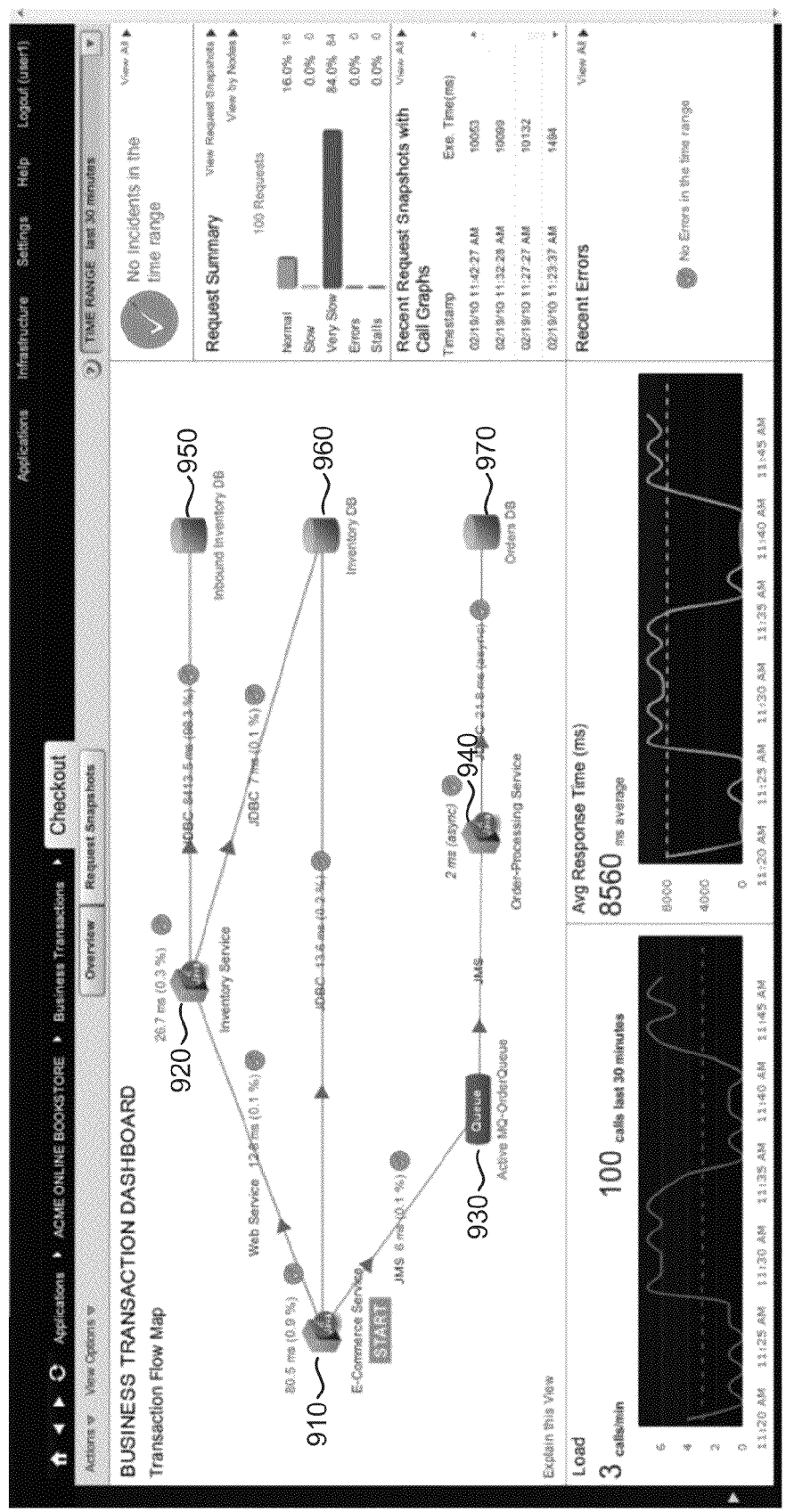
FIG. 10 is an exemplary interface for viewing monitoring data for business transactions.

A call chain for business transactions may be constructed from the received aggregated data at step 840. The call chain may be constructed by connecting data associated with sections of a business transaction based on call chain data in the received aggregated data. For example, a business transaction "Check-out" may involve communications from VM1 to VM2 to VM4 in FIG. 1. Each of agents 134, 144, and 164 may report aggregated data to controller 190. Agent 134 associated with VM1 may report data including the business transaction identifier, the time stamps associated with the start and end of the transaction (the transaction that begins with VM1 receiving a request and ends with VM1 sending a response), and an identification of entire call chain: VM1-VM2-VM4. Agent 144 associated with VM2 may report dada including the business transaction identifier, call chain data associated of VM1-VM2, and time stamp data associated with receiving a request from VM1, sending a request to VM4, receiving a response from VM4, and sending a response to VM1. Agent 164 associated with VM4 may report dada including the business transaction identifier, call chain data associated of VM3-VM4, and time stamp data associated with receiving a request from VM3, and sending a response to VM3. The information received from each agent for the identified business transaction may be used to generate a map of the transaction over different virtual machines. In this manner, the topology traversed by a business transaction can be determined by a controller without any prior knowledge. An example of the mapping of a business transaction is illustrated in the interfaces of FIGS. 9 and 10.

Performance information may be determined for the business transaction at step 845. The performance information may indicate the total response time for the business transaction and local response times by each node (e.g., processing time by each application server or virtual machine in the business transaction), as well as time periods between virtual machines within the system, as well as whether the performance was acceptable or unacceptable. For clusters representing a particular virtual machine, the aggregated data may be averaged together by the controller 190.

Performance baselines and alerts may be determined for business transactions based on the determined performance at step 850. In some embodiments, an average or baseline performance may be determined for a section of a business transaction, for example by averaging performance data for each section over a period of time. Once a baseline is determined, subsequent data can be compared to the baseline to determine if it is within a particular threshold based on the baseline. The threshold may be a predetermined percentage, such as 10%, the baseline itself, or some other value. Alternatively, a baseline and/or performance threshold may be determined manually or in some other manner. If performance data does not satisfy the threshold, an alert may be generated and reported to an administrator.

The performance may be reported for a business transaction at step 855. For example, the performance may be reported through an interface such as that shown in FIG. 9. After determining alerts or reporting the performance for business transactions, controller 190 may automatically monitor individual requests based on the business transaction performance at step 860. Automatically monitoring individual requests may include indicating to one or more agents that a particular request should be associated with a diagnostics status of "on."

FIG. 9 is an exemplary interface for viewing monitoring data for business transactions. In some embodiments, the interface of FIG. 9 can be provided by controller 190 as part of a web service provided over network server 125. The interface of FIG. 9 includes three monitored virtual machines 910, 920, and 940. The monitored system also includes message queue 930 and databases 950, 960 and 970. Agents located at the monitored virtual machines 910, 920 and 940 collect data and provide the aggregated runtime data to a controller such that the business transaction can be re-created as indicated in interface 900. As indicated, between virtual machines 910 and 920, four calls per minute were made from virtual machine 910 to virtual machine 920. Virtual machine 920 made approximately four calls per minute to database 950 and 26 calls per minute to database 960.

Interface 900 may be generated within a few minutes of initiating the monitoring of a particular system. By constructing the chain of a business transaction between monitored virtual machines, and associating the performance of each part of the chain, the application flow map such as that shown in interface 900 may be generated easily and quickly compared with other systems.

FIG. 10 is an exemplary interface for viewing monitoring data for business transactions. FIG. 10 illustrates the same virtual machine architecture as illustrated in FIG. 9. The information displayed for the virtual machines is associated with an application named "ACME Online Bookstore" and a business transaction of "Checkout" as indicated just above the interface. The interface of FIG. 9 includes three monitored virtual machines 910, 920, and 940, message queue 930 and databases 950, 960 and 970. The calls sent as part of the business transaction are labeled in representative communication lines between the machines as well as the time to process each call. For example, the business transaction "Checkout" included a JMS call from virtual machine 910 to message queue 930. The call from machine 910 to machine 930 took an average of 6 milliseconds. Also included in interface 1000 is an indication of a load history, average response time history, request summary, and other data.

Figure 11:
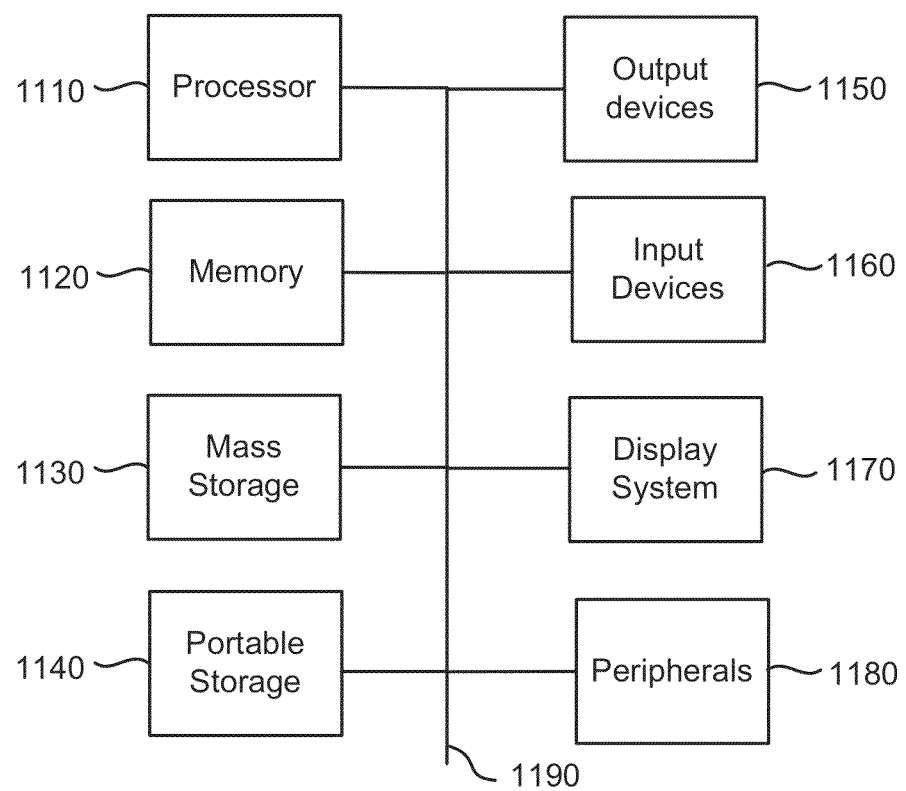
FIG. 11 is a block diagram of an exemplary computing device.

FIG. 11 illustrates an exemplary computing system 1100 that may be used to implement an embodiment of the present invention. System 1100 of FIG. 11 may be implemented in the contexts of the likes of data store 110, application server 120, network server 130, database 122, and clients 150-160. The computing system 1100 of FIG. 11 includes one or more processors 1110 and memory 1110. Main memory 1110 stores, in part, instructions and data for execution by processor 1110. Main memory 1110 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and main memory 1110 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 can store the system software for implementing embodiments of the present invention for purposes of loading that software into main memory 1110.

Portable storage device 1140 operates in conjunction with a portable non-volatile storage medium, such as a floppy disk, compact disk or Digital video disc, to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, or a pointing device, such as a mouse, a trackball, stylus, or cursor direction keys. Additionally, the system 1100 as shown in FIG. 11 includes output devices 1150. Examples of suitable output devices include speakers, printers, network interfaces, and monitors.

Display system 1170 may include a liquid crystal display (LCD) or other suitable display device. Display system 1170 receives textual and graphical information, and processes the information for output to the display device.

Peripherals 1180 may include any type of computer support device to add additional functionality to the computer system. For example, peripheral device(s) 1180 may include a modem or a router.

The components contained in the computer system 1100 of FIG. 11 are those typically found in computer systems that may be suitable for use with embodiments of the present invention and are intended to represent a broad category of such computer components that are well known in the art. Thus, the computer system 1100 of FIG. 11 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for communicating data between servers, comprising:
    detecting by a first computer a request to a second computer;
    sending the request and an unknown service identifier to the second computer by the first computer, the unknown service identifier generated by the first computer to identify the second computer in response to determining that an identity of the second computer is not known to the first computer, wherein the unknown service identifier is part of a call chain sent from the first computer to the second computer;
    transmitting the unknown service identifier and request information to a server by the first computer;
    transmitting the unknown service identifier and a second computer identifier to the server by the second computer, the second computer identifier identifying the second computer; and
    receiving the second computer identifier by the first computer from the server, the first computer sending a subsequent request to the second computer with the second computer identifier.

2. The method of claim 1, further comprising:
    detecting by the second computer that the first computer does not recognize the second computer based on the unknown service identifier received by the second computer from the first computer,
    wherein the unknown service identifier and second computer identifier transmitted by the second computer is in response to the detection by the second computer.

3. The method of claim 2, further comprising:
    receiving from the server by the first computer the second computer identifier.

4. The method of claim 1, wherein the first computer associates the second computer identifier with requests to the second computer as part of a distributed transaction.

5. The method of claim 1, further comprising generating the unknown service identifier for the second computer by the first computer.

6. The method of claim 1, wherein the first computer includes an first agent, the first agent detecting the request and transmitting the unknown service identifier and request information.

7. The method of claim 1, wherein the second computer includes a second agent, the second agent transmitting the unknown service identifier and a second computer identifier.

8. The method of claim 1, wherein the request is detected using byte code instrumentation.

9. The method of claim 1, wherein the request is detected using a hook embedded in an application that processes the request.

10. A non-transitory computer readable storage medium having embodied thereon a program, the program being executable by a processor to perform a method for correlating a distributed transaction, the method comprising:
    detecting by a first computer a request to a second computer;
    sending the request and an unknown service identifier to the second computer by the first computer, the unknown service identifier generated by the first computer to identify the second computer in response to determining that an identity of the second computer is not known to the first computer, wherein the unknown service identifier is part of a call chain sent from the first computer to the second computer;
    transmitting the unknown service identifier and request information to a server by the first computer;
    transmitting the unknown service identifier and a second computer identifier to the server by the second computer, the second computer identifier identifying the second computer; and
    receiving the second computer identifier by the first computer from the server, the first computer sending a subsequent request to the second computer with the second computer identifier.

11. The non-transitory computer readable storage medium of claim 10, further comprising:
    detecting by the second computer that the first computer does not recognize the second computer based on the unknown service identifier received by the second computer from the first computer,
    wherein the unknown service identifier and second computer identifier transmitted by the second computer is in response to the detection by the second computer.

12. The non-transitory computer readable storage medium of claim 11, further comprising:
    receiving from the server by the first computer the second computer identifier.

13. The non-transitory computer readable storage medium of claim 10, wherein the first computer associates the second computer identifier with requests to the second computer as part of a distributed transaction.

14. The non-transitory computer readable storage medium of claim 10, further comprising generating the unknown service identifier for the second computer by the first computer.

15. The non-transitory computer readable storage medium of claim 10, wherein the first computer includes an first agent, the first agent detecting the request and transmitting the unknown service identifier and request information.

16. The non-transitory computer readable storage medium of claim 10, wherein the second computer includes a second agent, the second agent transmitting the unknown service identifier and a second computer identifier.

17. The non-transitory computer readable storage medium of claim 10, wherein the request is detected using byte code instrumentation.

18. The non-transitory computer readable storage medium of claim 1, wherein the request is detected using a hook embedded in an application that processes the request.

19. A system comprising:
    one or more processors;
    a memory associated with each of the one or more processors; and
    one or more modules stored in the memory and executed by the one or more processors to detect by a first computer a request to a second computer, send the request and a unknown service identifier to the second computer by the first computer, the unknown service identifier generated by the first computer to identify the second computer in response to determining that an identity of the second computer is not known to the first computer, wherein the unknown service identifier is part of a call chain sent from the first computer to the second computer, transmit the unknown service identifier and request information to a server by the first computer, transmit the unknown service identifier and a second computer identifier to the server by the second computer, the second computer identifier identifying the second computer, and receive the second computer identifier by the first computer from the server, the first computer sending a subsequent request to the second computer with the second computer identifier.

20. The system of claim 19, the one or more modules executed to detect by the second computer that the first computer does not recognize the second computer based on the unknown service identifier received by the second computer from the first computer, wherein the unknown service identifier and second computer identifier transmitted by the second computer is in response to the detection by the second computer.

21. The system of claim 20, the one or more modules executed to receive from the server by the first computer the second computer identifier.

22. The system of claim 19, wherein the first computer associates the second computer identifier with requests to the second computer as part of a distributed transaction.

23. The system of claim 19, the one or more modules executed to generate the unknown service identifier for the second computer by the first computer.

24. The system of claim 19, wherein the first computer includes an first agent, the first agent detecting the request and transmitting the unknown service identifier and request information.

25. The system of claim 19, wherein the second computer includes a second agent, the second agent transmitting the unknown service identifier and a second computer identifier.

26. The system of claim 19, wherein the request is detected using byte code instrumentation.

27. The system of claim 19, wherein the request is detected using a hook embedded in an application that processes the request.

* * * * *